(12) United States Patent
Kean et al.

(10) Patent No.: US 11,647,686 B2
(45) Date of Patent: May 16, 2023

(54) SYSTEM AND METHOD FOR COMMUNICATING THE PRESENCE OF PROXIMATE OBJECTS IN A WORKING AREA

(71) Applicant: Deere & Company, Moline, IL (US)

(72) Inventors: Michael G. Kean, Dubuque, IA (US); Drew F. Harwell, Dubuque, IA (US)

(73) Assignee: Deere & Company, Moline, IL (US)

( * ) Notice: Subject to any disclaimer, the term of this patent is extended or adjusted under 35 U.S.C. 154(b) by 443 days.

(21) Appl. No.: 16/831,695

(22) Filed: Mar. 26, 2020

(65) Prior Publication Data

US 2021/0298220 A1 Sep. 30, 2021

(51) Int. Cl.
| | |
|---|---|
| *A01B 69/00* | (2006.01) |
| *G05D 1/02* | (2020.01) |
| *A01B 69/04* | (2006.01) |

(52) U.S. Cl.
CPC .......... *A01B 69/004* (2013.01); *A01B 69/008* (2013.01); *G05D 1/0255* (2013.01); *G05D 2201/0201* (2013.01); *G05D 2201/0202* (2013.01)

(58) Field of Classification Search
CPC .................................................. A01B 69/004
See application file for complete search history.

(56) References Cited

U.S. PATENT DOCUMENTS

| | | | | |
|---|---|---|---|---|
| 5,160,056 A | * | 11/1992 | Yoshimatsu | ........ B66C 23/905 212/277 |
| 5,645,395 A | * | 7/1997 | Huang | .............. B66C 23/24 212/199 |
| 6,170,681 B1 | * | 1/2001 | Yoshimatsu | ........ B66C 23/905 212/278 |
| 7,671,725 B2 | * | 3/2010 | Tsuji | ............... G06V 40/103 340/944 |
| 8,954,252 B1 | | 2/2015 | Urmson et al. | |

(Continued)

FOREIGN PATENT DOCUMENTS

| | | | | | |
|---|---|---|---|---|---|
| CN | 109936975 A | * | 6/2019 | ........ | A01B 69/00 |
| CN | 109964190 A | * | 7/2019 | ........ | A01B 69/00 |

(Continued)

*Primary Examiner* — Shelley Chen
(74) *Attorney, Agent, or Firm* — Gary L. Montle; Lucian Wayne Beavers; Patterson Intellectual Property Law, PC (57) ABSTRACT

A self-propelled work vehicle is provided with systems and methods for communicating the presence of nearby objects to an operator. A horizontally rotatable machine frame supports a work implement which is further vertically rotatable. Various object sensors are each configured to generate object signals representative of detected objects in respective fields of vision. A controller determines a working area for the work vehicle, corresponding at least to a swing radius of the machine frame and optionally further to a swing radius of the work implement at a given orientation and/or angle of rotation. The controller determines positions of each detected object relative to the machine frame based on the object signals and known positions of the respective object sensors, and generates output signals based on the determined object positions with respect to the working area. The output signals may facilitate vehicle interventions, and/or visual alerts corresponding to bird's eye displays.

18 Claims, 4 Drawing Sheets

(56) References Cited

U.S. PATENT DOCUMENTS

| | | | | |
|---|---|---|---|---|
| 10,479,354 B2* | 11/2019 | Posselius | ............... | E02F 9/24 |
| 11,142,891 B2* | 10/2021 | Nishizawa | ............... | E02F 9/265 |
| 2016/0006947 A1* | 1/2016 | Kowatari | ............... | H04N 5/265 |
| | | | | 348/148 |
| 2017/0131722 A1 | 5/2017 | Hiramatsu et al. | | |
| 2017/0135277 A1 | 5/2017 | Hiramatsu et al. | | |
| 2019/0032305 A1* | 1/2019 | Hageman | ............... | E02F 3/847 |
| 2019/0037148 A1* | 1/2019 | Kowatari | ............... | H04N 23/635 |
| 2020/0048871 A1* | 2/2020 | Nishizawa | ............... | E02F 9/265 |

FOREIGN PATENT DOCUMENTS

| | | | | |
|---|---|---|---|---|
| CN | 111051922 A * | 4/2020 | ............. | B60Q 5/006 |
| CN | 113428791 A * | 9/2021 | | |
| CN | 109790701 B * | 2/2022 | ............. | E02F 9/2004 |
| WO | WO-2016051929 A1 * | 4/2016 | ............. | B60R 25/20 |
| WO | WO-2016098462 A1 * | 6/2016 | ............. | B60R 25/24 |
| WO | WO-2018159718 A1 * | 9/2018 | ........... | F01N 13/009 |

* cited by examiner

SYSTEM AND METHOD FOR COMMUNICATING THE PRESENCE OF PROXIMATE OBJECTS IN A WORKING AREA

FIELD OF THE DISCLOSURE

The present disclosure relates to self-propelled and rotating vehicles such as work vehicles configured to provide improved operational awareness for human operators thereof. More particularly, the present disclosure relates to systems and methods for automatically sensing objects within a tail or forward swing radius of a work vehicle, and selectively alerting an operator to such objects and/or programmatically intervening in aspects of the machine operation.

BACKGROUND

Work vehicles as discussed herein may for example include excavator machines, forestry swing machines, skid steer loaders, compact track loaders, and other equipment which modify the terrain or equivalent working environment in some way, and more particularly are further capable of rotating. These machines may have tracked or wheeled ground engaging units supporting the undercarriage from the ground surface, and may further include one or more working implements which are used to, for example, modify the terrain in coordination with movement of the machine.

There is an ongoing need in the field of such work vehicles for solutions that provide better operational awareness for the operator. One problem for the operator is that the surroundings of the work vehicle can only be seen to a limited extent from the operator cab. There is an added difficulty in the case of front loader and rear loader work machines, wherein the operator's view may be substantially limited to the front or rear depending on the orientation and position of the work implement(s). Consequently, the operator may be unable to sufficiently identify external objects from a typical working position that are concealed by the work implement in his field of vision. Of particular importance may be objects that are to the rear of the operator's field of vision and within the pivoting range of the machine frame and/or work implement.

Some conventional systems involve cameras which record an image of a rearward region of the work vehicle, which is displayed on a display unit arranged in the operator cab. Other known systems include cameras mounted to provide a "bird's eye" view of the machine when their respective images are stitched together. These systems can help an operator to see what is around the vehicle, but in practical terms that are only functional for their intended purpose when the operator is actually looking at the monitor.

BRIEF SUMMARY OF THE DISCLOSURE

The current disclosure provides an enhancement to conventional systems, at least in part by mounting an object detection system in association with the work vehicle and using it to alert the operator, e.g., when there is a reason to look at the monitor to see what the camera systems are saying, and optionally to intervene in machine operations as needed to prevent collisions.

In an embodiment, a self-propelled work vehicle as disclosed herein comprises a machine frame supported by a plurality of wheels or tracks, wherein the work vehicle frame is selectively rotatable about a vertical axis associated with the machine frame. An exemplary such work vehicle may be a skid steer loader effectively having zero-radius rotating capability about a common vertical axis in either direction of rotation, but the present embodiment is not so limited and further contemplates work vehicles having less precise rotation capabilities. A work implement is supported by the machine frame and selectively rotatable about one or more axes (e.g., horizontal axes whereby the implement is selectively lifted on either or both of opposing front and rear ends) associated with the machine frame. A plurality of object sensors are each configured to generate object signals representative of detected objects in a respective field of vision. A controller is functionally linked to the plurality of object sensors and to one or more drive units associated with the work implement and the plurality of wheels or tracks. The controller is configured to determine a working area for the work vehicle, corresponding at least to a swing radius of the machine frame, determine a position of each detected object relative to the machine frame based on the object signals and known positions of the respective object sensors, and generate output signals based on the determined positions of each detected object with respect to the determined working area.

In one exemplary aspect of the above-referenced embodiment, one or more of the plurality of object sensors may comprise ultrasonic sensors configured to generate object signals corresponding to a distance between a detected object and the respective sensor.

In another exemplary aspect of the above-referenced embodiment, the swing radius of the machine frame further comprises a swing radius of the work implement which is determined based on an orientation of the work implement and/or an angle of rotation about the one or more axes. The controller is configured to receive signals representative of the orientation and/or rotational movement of the work implement, and to generate the output signals further based on a predicted working area in view of the orientation and/or rotational movement of the work implement.

For example, the output signals may comprise one or more control signals to disable rotational movement of the machine frame if one or more objects are detected within a swing radius of the machine frame, and to disable rotational movement of the machine frame and of the work implement if one or more objects are detected within a swing radius of the work implement.

In another exemplary aspect of the above-referenced embodiment, the controller may be further configured to receive signals representative of a detected movement and orientation of the wheels or tracks, and generate the output signals further based on the predicted working area in view of the detected movement and orientation of the wheels or tracks.

In another exemplary aspect of the above-referenced embodiment, the controller may be further configured to receive signals representative of an intended movement and orientation of the wheels or tracks, and generate the output signals further based on the predicted working area in view of the intended movement and orientation of the wheels or tracks.

For example, locations of each detected objects may be determinable in a reference plane independent of an orientation of the machine frame, wherein the predicted working area is determined further based on an intended movement of the work vehicle in the reference plane independent of the orientation of the machine frame.

In another exemplary aspect of the above-referenced embodiment, the output signals may comprise one or more control signals to disable movement of the wheels or tracks if one or more objects are detected within the determined working area.

In another exemplary aspect of the above-referenced embodiment, the controller may be configured to receive signals representative of a movement and orientation of the wheels or tracks, and to generate at least the one or more control signals to disable movement of the wheels or tracks, when the vehicle is detected as moving and further based on a predicted working area, and wherein the output signals are at least provided to generate one or more visual or audible alerts to an operator of the vehicle, when the vehicle is not moving.

In another exemplary aspect of the above-referenced embodiment, a display unit is located in association with an operator of the vehicle. The output signals may accordingly be at least provided to generate visual alerts on the display unit identifying sensors corresponding to the determined positions of each detected object with respect to the determined working area.

In another exemplary aspect of the above-referenced embodiment, a plurality of cameras are provided, each of which is configured to generate images corresponding to a respective image region, wherein a field of vision for each of the plurality of object sensors overlaps with the image region for at least one of the plurality of cameras. The output signals from the controller may at least be provided to selectively generate images from one or more of the cameras on the display unit, with the one or more cameras having image regions corresponding to the determined positions of each detected object with respect to the determined working area.

In another exemplary aspect of the above-referenced embodiment, the swing radius of the work implement is determined based on an orientation of the work implement and/or an angle of rotation about the one or more axes. The controller is configured to receive signals representative of the orientation and/or rotational movement of the work implement, and of a movement and orientation of the wheels or tracks. A working area is predicted in view of the orientation and/or rotational movement of the work implement and further in view of the movement and orientation of the wheels or tracks, and output signals are provided to prioritize one or more of the cameras in the selectively generated images on the display unit based on the determined positions of each detected object with respect to the predicted working area.

In another exemplary aspect of the above-referenced embodiment, overlapping images may be generated from each individual image region and automatically joined together to form a total image on the display unit from a bird's eye view. The output signals from the controller may further be at least provided to visually render the determined positions of each detected object in association with the total image on the display unit.

Numerous objects, features and advantages of the embodiments set forth herein will be readily apparent to those skilled in the art upon reading of the following disclosure when taken in conjunction with the accompanying drawings.

DETAILED DESCRIPTION

Generally stated, a work vehicle as disclosed herein includes systems and methods which monitor the surroundings of the vehicle, alerts the operator when an object is present and they need to look at the monitor, and gives the operator enough information to know where the object is around the vehicle and which portion of the camera view to look at to identify the object.

Figure 1:
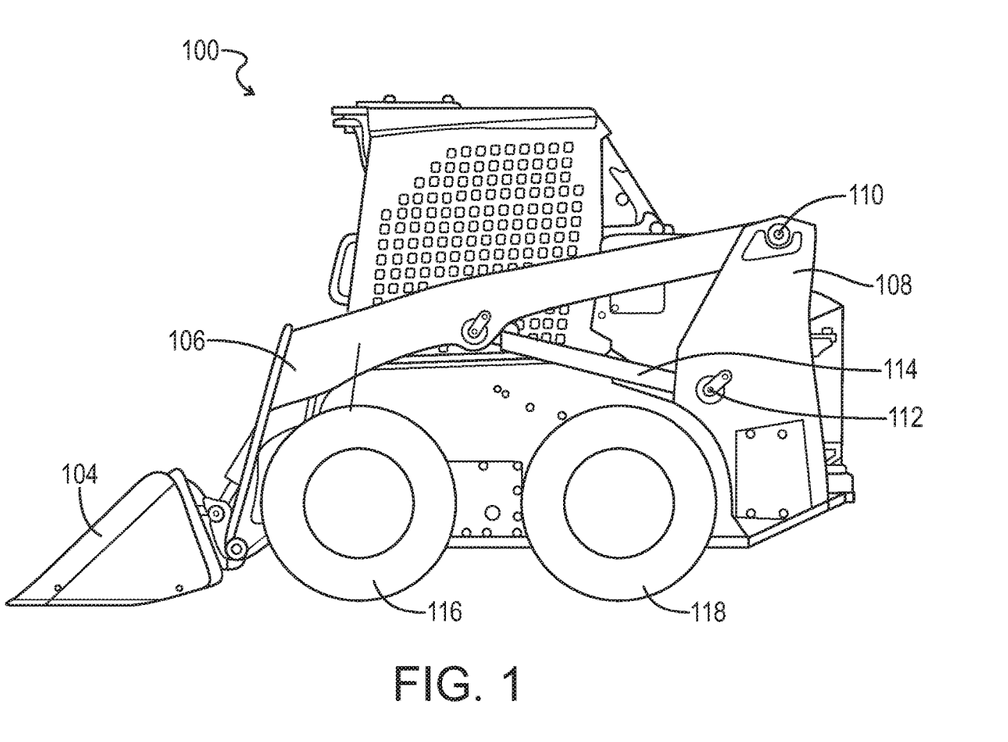
FIG. 1 is a side elevation view of a skid-steer loader as a self-propelled work vehicle incorporating one or more embodiments of a system and/or method as disclosed herein.

Referring now to the drawings and particularly to FIG. 1, a representative work vehicle is shown and generally designated by the number 100. FIG. 1 shows a skid steer loader 100. Various systems and methods as disclosed herein are applicable to similar or otherwise equivalent vehicles, such as forestry swing machines, compact track loaders, and other work vehicles of the type having rotation capabilities and one or more working implements for modifying the proximate terrain. In certain embodiments, systems and methods as disclosed herein may also be applicable to vehicles lacking explicit work implements.

Work vehicles as discussed herein may typically have tracked or wheeled ground engaging units supporting the undercarriage from the ground surface. The ground engaging unit for the skid steer loader 100 represented in FIG. 1 comprises a pair of front wheels 116 and a pair of rear wheels 118. In alternative work vehicles, such as for example a compact track loader, the ground engaging unit may instead comprise a drive track disposed on each side of the machine (not shown). The work vehicle 100 may further include at least one drive unit (not shown) including for example a travel motor for driving the respective ground engaging units. In a conventional skid steer loader, the operator can manipulate controls to drive the left-side wheels and the right-side wheels at different speeds to thereby steer the work vehicle. While the left-side wheels and the right-side wheels in such a configuration are typically maintained in a longitudinal orientation with respect to the machine frame, the vehicle is nonetheless capable of rotation in substantially a zero-degree radius about a vertical axis.

A lift mechanism for the work vehicle may typically include one or more work implements 104 such as a loader bucket pivotally coupled to a forward portion of an arm 106 on either side of the work vehicle, wherein the arms are themselves further connected to respective side portions 108 of the machine frame and pivotable about at least one generally horizontal axis 110 relative to the main frame. Although particular pivot axes are represented in FIG. 1, it may be understood that one or more lifting bars and associated hydraulic assemblies may be provided for extended reach of the lift arm 106 and the work implement 104, wherein for example the lifting movement of the implement may be controlled to be substantially vertical and the angles of rotation for the lift arm may be about one or more horizontal axes which are not dynamic (i.e., not fixed to a portion of the machine frame) but still associated generally with the machine frame.

An operator's cab may be located on the main frame. The operator's cab and the one or more working implements 104 may both be mounted on the main frame so that the operator's cab faces in the working direction of the working implements. A control station including a user interface may be located in the operator's cab.

Figure 2:
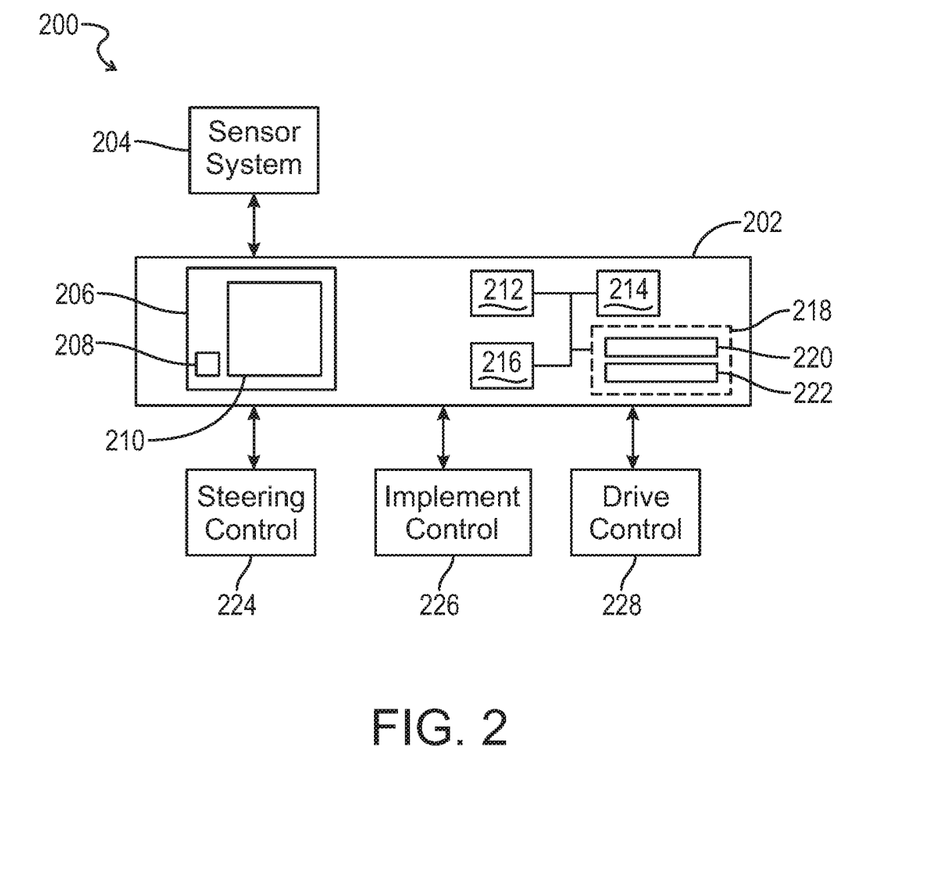
FIG. 2 is a block diagram representing an exemplary control system for the work vehicle of FIG. 1.

As schematically illustrated in FIG. 2, the work vehicle 100 includes a control system 200 including a controller 202. The controller may be part of the machine control system of the work vehicle, or it may be a separate control module. The controller may include the user interface 206 and optionally be mounted in the operators cab at a control panel.

The controller 202 is configured to receive input signals from some or all of various sensors collectively defining a sensor system 204. Certain of these sensors may be provided to detect machine operating conditions or positioning, including for example an orientation sensor, global positioning system (GPS) sensors, vehicle speed sensors, vehicle implement positioning sensors, and the like, and whereas one or more of these sensors may be discrete in nature the sensor system may further refer to signals provided from the machine control system.

Other sensors in the sensor system 204 more particularly refer to a group of sensors referred to herein as object sensors 204. Various examples of object sensors are conventionally known and may include ultrasonic sensors, laser scanners, radar wave transmitters and receivers, thermal sensors, imaging devices, structured light sensors, and other optical sensors. The types and combinations of object sensors may vary for a type of work vehicle, work area, and/or application, but generally are provided and configured to optimize recognition of objects proximate to, or otherwise in association with, a determined working area of the vehicle. In some embodiments the object sensors, which hereinafter may be referred to for illustrative but non-limiting purposes as ultrasonic sensors, may include the ability to determine an object position as well as an object distance.

The controller 202 may typically produce an output regarding the determined positions of detected objects, as further described below, to the user interface 206 for display to the human operator. The controller may further or in the alternative generate control signals for controlling the operation of respective actuators, or signals for indirect control via intermediate control units, associated with a machine steering control system 224, a machine implement control system 226, and/or a machine drive control system 228.

The controller 202 includes or may be associated with a processor 212, a computer readable medium 214, a communication unit 216, data storage 218 such as for example a database network, and the aforementioned user interface 206 or control panel 206 having a display 210. An input/output device 208, such as a keyboard, joystick or other user interface tool, is provided so that the human operator may input instructions to the controller. It is understood that the controller described herein may be a single controller having all of the described functionality, or it may include multiple controllers wherein the described functionality is distributed among the multiple controllers.

Various operations, steps or algorithms as described in connection with the controller 202 can be embodied directly in hardware, in a computer program product such as a software module executed by the processor 212, or in a combination of the two. The computer program product can reside in RAM memory, flash memory, ROM memory, EPROM memory, EEPROM memory, registers, hard disk, a removable disk, or any other form of computer-readable medium 214 known in the art. An exemplary computer-readable medium can be coupled to the processor such that the processor can read information from, and write information to, the memory/storage medium. In the alternative, the medium can be integral to the processor. The processor and the medium can reside in an application specific integrated circuit (ASIC). The ASIC can reside in a user terminal. In the alternative, the processor and the medium can reside as discrete components in a user terminal.

The term "processor" as used herein may refer to at least general-purpose or specific-purpose processing devices and/or logic as may be understood by one of skill in the art, including but not limited to a microprocessor, a microcontroller, a state machine, and the like. A processor can also be implemented as a combination of computing devices, e.g., a combination of a DSP and a microprocessor, a plurality of microprocessors, one or more microprocessors in conjunction with a DSP core, or any other such configuration.

The communication unit 216 may support or provide communications between the controller and external systems or devices, and/or support or provide communication interface with respect to internal components of the work vehicle. The communications unit may include wireless communication system components (e.g., via cellular modem, WiFi, Bluetooth or the like) and/or may include one or more wired communications terminals such as universal serial bus ports.

The data storage 218 in an embodiment may be configured to at least receive and store real-time and/or historical data sets regarding machine parameters 220 and real-time and/or historical data sets regarding detected object parameters 222 in selectively retrievable form. Data storage as discussed herein may, unless otherwise stated, generally encompass hardware such as volatile or non-volatile storage devices, drives, memory, or other storage media, as well as one or more databases residing thereon.

Referring generally to FIGS. 1-4, exemplary modes of operation may further be described with respect to the aforementioned work vehicle.

As previously noted, a sensor system 204 is provided for detecting objects in proximity with respect to the work vehicle 100. In a particular exemplary embodiment, the sensor system comprises a series of ultrasonic sensors mounted around the periphery of the work vehicle. As the vehicle is capable of rotating in either direction, the sensors may preferably be mounted in an arrangement which collectively encompasses an area fully surrounding the work vehicle. The ultrasonic sensors emit and then receive ultrasonic chirps, wherein the individual sensors may be configured to determine whether objects are present in their field of view. When objects are present, the sensors may be configured to further determine the distance between the sensor and the objects, and communicate the determined distance to the controller 202. In various embodiments, the sensors may transmit output signals to the controller which correspond to the distances between the given sensor and objects, wherein the controller is configured to translate the output signals received from the sensors into the corresponding distance values. In certain alternative embodiments, the sensors may include processing devices capable of converting the raw sensor signals into a distance value which is communicated to the controller without requiring further translation or calibration at the controller end.

The controller 202 combines information about the mounting location of the sensor with the detected distance to the nearest object. In an embodiment, the controller may for example identify a particular sensor in correlation with received output signals, and selectively retrieve sensor location data from onboard data storage for implementation in the distance detection step.

The controller 202 further determines whether there are any objects within a swing radius of the work vehicle 100. Generally speaking, the relevant swing radius of the work vehicle may comprise at least a tail swing radius, as objects to the rear of the vehicle are outside of the typical field of view of the operator and therefore of primary concern.

Figure 3:
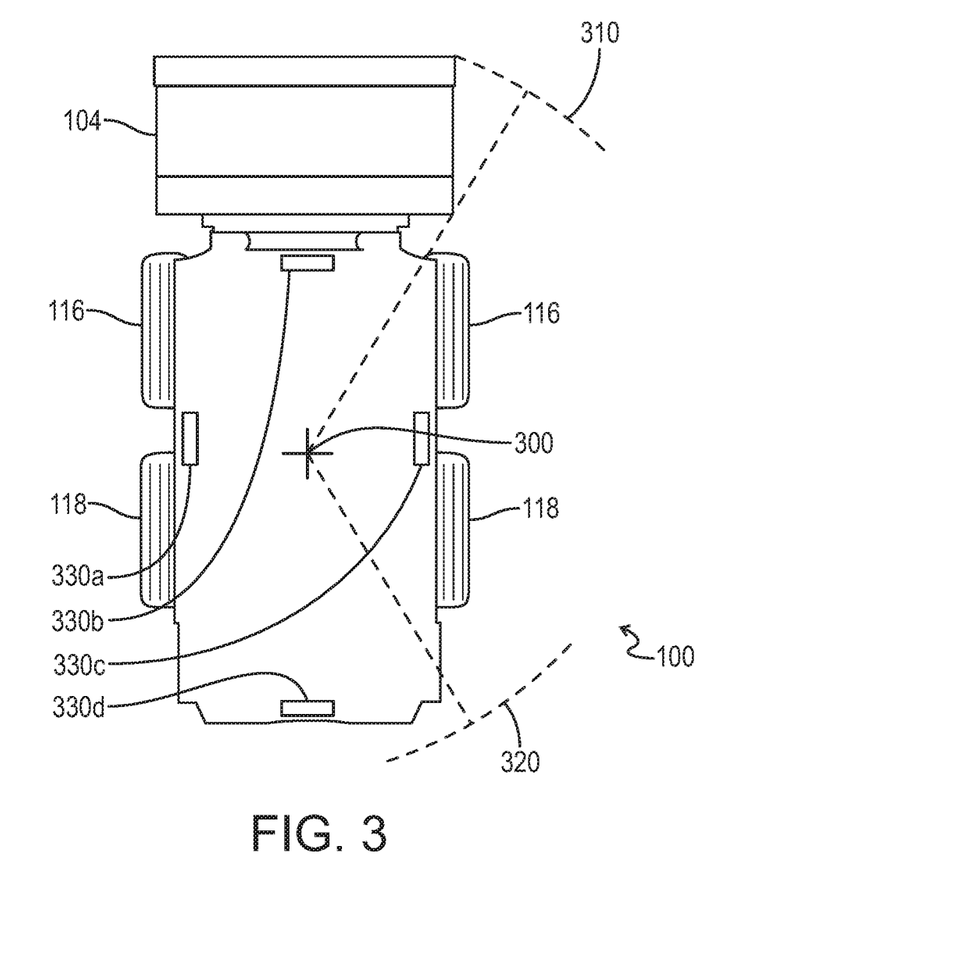
FIG. 3 is an overhead schematic view representing an exemplary machine frame swing radius comprising a tail swing radius and a work implement swing radius.

Referring to FIG. 3 for illustrative purposes, the "tail swing radius" 320 as generally discussed herein may refer to a radius 320 drawn from a vertical axis 300 associated with the work vehicle 100 to the farthest edge of a rear portion of the work vehicle as it theoretically rotates about the axis 300. In some cases, a margin of safety may also be added in a determination of the tail swing radius, which may simply be a percentage or nominal value supplemented to a base radius value. In addition, although a skid-steer loader of the present example may be capable of substantially zero-degree rotation, wherein the vertical axis about which the vehicle rotates may be as illustrated in FIG. 3 or otherwise accounted for by the controller with some precision, other types of work vehicles capable of implementing the disclosed systems and methods will have varying capacities of rotation. Accordingly, the controller may be configured to determine a vertical axis of rotation associated with the machine frame in response to detected movements or intended movements of the ground engaging units, and further dynamically determine the tail swing radius of the work vehicle based at least in part thereon.

In some embodiments, the relevant swing radius of the work vehicle 100 may further comprise a forward swing radius or implement swing radius 310. Although the work implement 104 as illustrated in FIG. 1 is in the typical field of view for the operator, the field of view for the operator may still be blocked by the work implement or the operator may be otherwise distracted from an object in this area, wherein the systems and methods as disclosed herein may identify and account for objects in such a swing radius as well. As with determination of the tail swing radius 320 discussed above, the implement swing radius 310 may also account for a margin of safety or a dynamically determined vertical axis associated with the machine frame rather than a purely mathematical and fixed value.

In addition, determination of the implement swing radius 310 may further account for an orientation and/or angle of rotation of the work implement 104, including one or more arms 106 or other lift assembly components 112, 114 collectively and pivotally coupling the work implement 104 to the work vehicle 100. In other words, as the work implement is lifted, lowered, rotated, or otherwise caused to travel through a path of movement, the relevant implement swing radius 310 may be impacted and the controller 202 may be configured to account for these variances accordingly.

In the example provided above, it may generally be considered that the implement swing radius 310 corresponds to a swing radius of a front portion of the machine frame, further in view of the configuration, orientation, and/or angle of rotation of a work implement which does not itself swing from side to side relative to a longitudinal axis of the machine frame. However, in some embodiments it may further be considered that the work implement is configured to rotate about a substantially vertical axis, independently of rotation of the machine frame.

In an embodiment, the controller 202 may be configured to look up a threshold distance for each sensor 204 corresponding to the tail swing radius 320 for the work vehicle 100, for example in response to a turning movement of the work vehicle. A detected movement, or intended movement, of the vehicle may result in a specified working area being determined by the controller, wherein the controller may further identify one or more sensors with fields of view overlapping at least in part with the specified working area. As previously noted, a tail swing radius (or other relevant swing radius) may be fixed or dynamically further determined in association with the specified working area and further in view of the particular movements of the work vehicle. Accordingly, the controller will be able to look up (or determine) the threshold distance for at least the relevant sensors, or optionally for each sensor mounted on the work vehicle if the working area.

The controller 202 can, for each of the relevant sensors 204, then compare the sensed distance to the corresponding threshold distance, and determine if any of the sensed distances are smaller than the threshold distance. If an object is detected within the specified working area (i.e., corresponding to the relevant tail swing radius and/or implement swing radius or other relevant area) then the controller generates one or more output signals.

In an embodiment, the output signals may be implemented to automatically control or otherwise disable control of the steering control 224, implement control 226, and/or drive control 228 units of the work vehicle 100, based on the particular determined positions of each detected object with respect to the determined working area. The controller 202 may accordingly intervene with standard vehicle operation to avoid a collision with detected objects.

In other embodiments, the output signals may be implemented to display information corresponding to the detected objects, and optionally to further issue an audible alert, for example prompting the operator to view the display.

The controller 202 may be configured to communicate with a display unit 210 which ultrasonic sensors 204 have sensed objects. The controller 202 may alternatively or in addition be configured to communicate with the display unit 210 which ultrasonic sensors 204 have sensed an object that is within the tail swing radius 320 of the work vehicle 100.

Responsive to output signals from the controller 202, the display unit 210 may generate a rendered image that communicates the presence of objects near the vehicle 100. For example, the rendered image may communicate which sensor(s) have detected objects, and/or may communicate which sensor(s) have detected objects within the tail swing radius.

In an embodiment, the display unit 210 may further show one or more camera views. As shown in FIG. 3, multiple cameras 330 may be mounted on respective portions of the machine frame for capturing images, which may further be processed by the controller or a discrete image processing system (not shown), wherein several camera views may be displayed in their own respective tiles on the display unit. The controller 202 and display unit 210 may coordinate to prioritize the displayed renderings, based for example on a proximity of objects or a type of objects that have been detected, and/or further in view of whether or not the objects are within the relevant swing radius and immediate attention is desirable.

The display unit 210 may be configured to display work vehicle operation data during a normal operation, such as for example would correspond to conventional gauges or status indicators, wherein the display unit may further be configured to change the displayed information to a camera view when an object is detected by the ultrasonic sensors and the control system. In this mode the display unit may further communicate which portion of the machine was being shown, and/or which sensor had detected an object. System logic may be implemented to determine which camera view is most critical, or otherwise prioritize the relevant views, when several sensors detect objects.

In another embodiment, a single Bird's Eye View may be stitched from images obtained from the several cameras 330 shown in the display unit 210.

Figure 4:
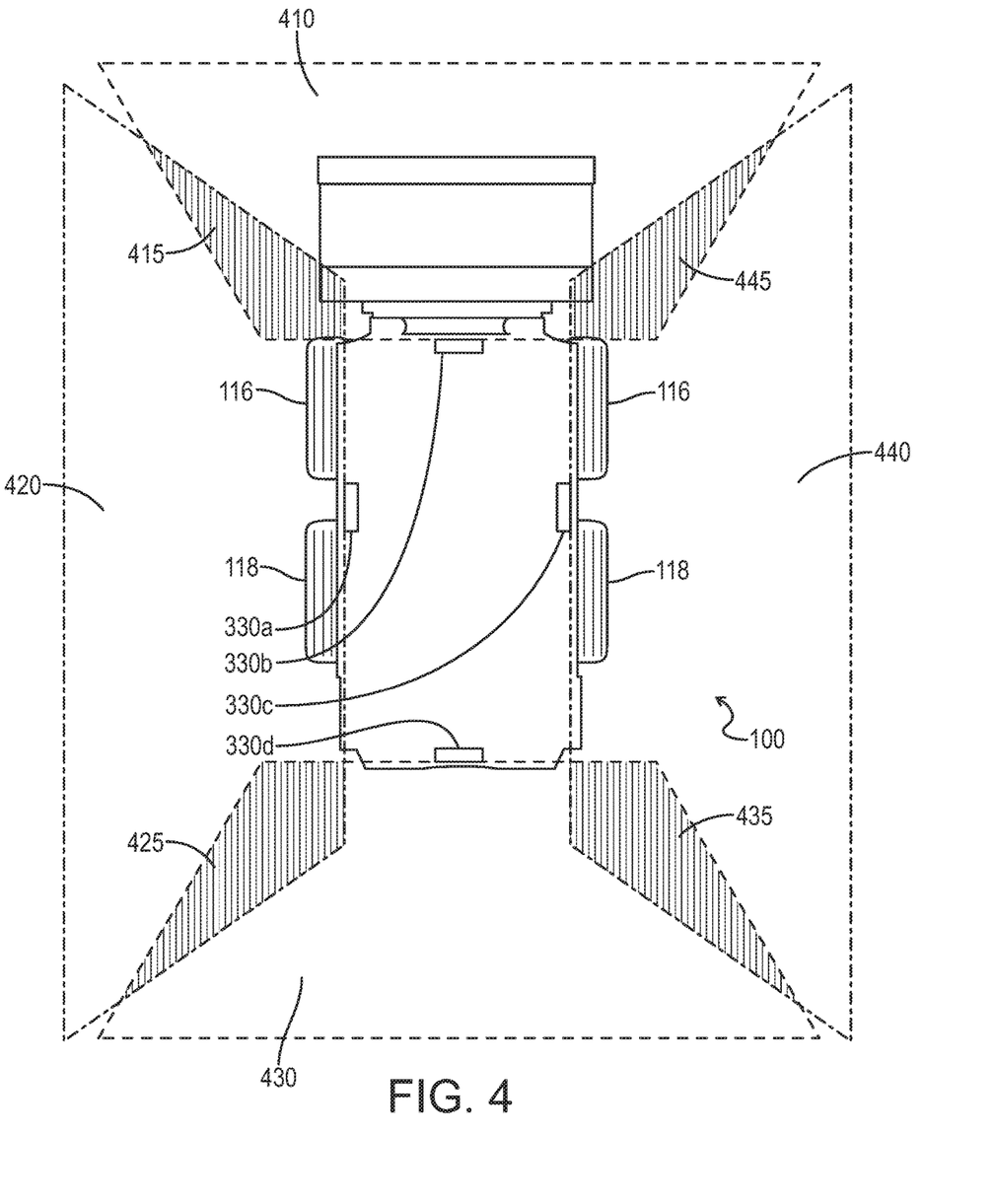
FIG. 4 is an overhead schematic view representing an exemplary bird's eye view with overlapping image regions for associated image capturing devices in an arrangement as disclosed herein.

Referring to FIG. 4, such an embodiment is implemented using four cameras 330, but alternative configurations may be desirable for certain types of work vehicles and are fully considered within the scope of the present disclosure. The four cameras may include a first camera 330*a* mounted on a left side of the work vehicle and arranged to capture a first viewing area 420, a second camera 330*b* mounted on a front side of the work vehicle and arranged to capture a second viewing area 410, a third camera 330*c* mounted on a right side of the work vehicle and arranged to capture a third viewing area 440, and a fourth camera 330*d* mounted on a rear side of the work vehicle and arranged to capture a fourth viewing area 430.

The position and size of the viewing area recorded by a respective camera 330 may typically depend on the arrangement and orientation of the camera on the machine frame and further on the camera lens system, in particular the focal length of the lens of the camera.

The positions and sizes of the viewing areas in FIG. 4 should accordingly only be considered as exemplary, as they will vary for any number of parameters in a particular implementation. In an embodiment, each camera may be fastened to the machine frame at a specific setting angle in relation to the plane of the machine frame, so that the viewing direction of the camera is inclined downwardly in a sloping manner to the ground surface when the machine frame is oriented parallel to the ground surface. Whereas each camera 330A, 330B, 330C, 330D would record a substantially rectangular image detail of the ground surface if the viewing direction of the camera was orthogonal to the ground surface, in accordance with the above-referenced setting angles a trapezoidal image region of the ground surface is recorded by each camera. The course of the Bird's Eye View stitching may depend on the position and size of the overlapping trapezoidal image details 415, 425, 435, 445.

The terms "left", "right", "front", and "rear" as used herein may refer to the conventional use of the terms relative to a working direction of the work vehicle. In other words, for a skid-steer loader having a work implement as illustrated, the front side of the vehicle would correspond to a leading edge of the vehicle when traveling in a working direction. However, the terms are not intended as limiting on the scope of the disclosure, and alternative arrangements are reasonably contemplated.

In an embodiment, a rendered image of detected objects may be placed directly on top of the Bird's Eye View, so that for example the detection zones may be rendered in translucent colors and directly correlate to the camera image behind the rendering. Such visible highlighting may be supplemented with, e.g., audible alerts for prompting the operator to look at the display unit, while further facilitating quick and easy recognition of a detection zone and the object at issue.

Although certain embodiments of the display functionality have been disclosed with more particularity than others, the display unit 210 as disclosed herein may show a Bird's Eye View, a backup camera style view, or any other camera view that helps the operator detect objects near the vehicle.

Further, output signals from a controller may be generated for display purposes to any appropriate user interface (e.g., control panel within the operator cab, mobile computing device, remote display) and/or to machine control units associated with the work vehicle.

For example, an operator is seated in the operator cab of a self-propelled work vehicle as disclosed herein. The work vehicle is not currently moving, and no user manipulation of vehicle interface components is detected such that an intended movement of the ground engaging units is demonstrated. However, one or more sensors (e.g., ultrasonic sensors) detect an object entering an area within a swing radius of the vehicle.

In one embodiment, upon detection of the object the operator may be audibly and/or visibly prompted to view a display unit associated with a control panel within the operator cab, or a mobile computing device, wherein the relevant sensor is identified and/or a camera image including the detected object is highlighted. Such a response may for example be triggered upon an object to the rear of the work vehicle being detected within a tail swing radius of the machine frame, or alternatively the system may utilize a larger of the tail swing radius and an implement swing radius, regardless of whether the object is detected to the rear, side, or front of the work vehicle.

In another embodiment, the system response may be withheld unless or until the machine is caused to move, wherein the system determines that the detected object is within a predicted working area corresponding to the tail swing radius and the predicted/intended movement of the work vehicle, and the operator is audibly and/or visibly prompted to view a display unit associated with a control panel within the operator cab, or a mobile computing device, wherein the relevant sensor is identified and/or a camera image including the detected object is highlighted. When forward, backward, or rotary movement of the work vehicle is detected or predicted, the working area is not limited to the tail swing radius of the machine frame, but may optionally further comprise a predicted path of the machine frame and associated swing radius along said path, such that objects that are currently outside of any swing radius of the machine frame may still be identified as within the working area of the machine frame for notification and/or intervention purposes as disclosed herein.

In another embodiment, the aforementioned system response may be substituted with or even replaced by an automated intervention wherein one or more movements or operations of the work vehicle are disabled when an object is detected as being within a current or predicted working area of the work vehicle corresponding to the tail swing radius and the predicted/intended movement of the work vehicle.

One or more of the above-referenced exemplary embodiments may be available for a given work vehicle as disclosed herein. Various of the above-referenced exemplary embodiments may be implemented, alone or in some combination, as selectable operating modes for the work vehicle. Alternatively, certain of the above-referenced exemplary embodiments may be implemented automatically in association with a detected operating mode for the work vehicle.

Thus it is seen that the apparatus and methods of the present disclosure readily achieve the ends and advantages mentioned as well as those inherent therein. While certain preferred embodiments of the disclosure have been illustrated and described for present purposes, numerous changes in the arrangement and construction of parts and steps may be made by those skilled in the art, which changes are encompassed within the scope and spirit of the present disclosure as defined by the appended claims. Each disclosed feature or embodiment may be combined with any of the other disclosed features or embodiments.

What is claimed is:

1. A self-propelled work vehicle comprising:
a machine frame supported by a plurality of ground engaging units, wherein the machine frame is selectively rotatable relative to the ground engaging units or based on differential driving of the ground engaging units;
a work implement supported by the machine frame and extending from a first end thereof, and selectively rotatable about one or more axes associated with the machine frame;
a plurality of object sensors, each configured to generate object signals representative of detected objects in a respective field of vision, wherein at least one of the plurality of object sensors has a field of vision including surroundings of an opposing second end of the machine frame with respect to the first end;
a display unit located in association with an operator of the vehicle;
a plurality of cameras, each camera configured to generate images corresponding to a respective image region, wherein the field of vision for each of the plurality of object sensors overlaps with the image region for at least one of the plurality of cameras; and
a controller functionally linked to the plurality of object sensors and to one or more drive units associated with the work implement and the plurality of ground engaging units, wherein the controller is configured to
determine a working area for the work vehicle, corresponding at least to a swing radius of the second end of the machine frame and to detected and/or intended movements of the machine frame,
for each object sensor, to determine a distance from the respective object sensor to any one or more detected objects in the respective field of vision, and to compare the distance for each of the one or more detected objects to a threshold value that is determined based at least on the determined working area and on known positions of the respective object sensors relative to the machine frame, and
generate output signals based on the compared distances for each of the one or more detected objects with respect to the respective threshold values,
wherein one or more of the output signals are provided to generate visual alerts on the display unit identifying sensors corresponding to the determined positions of each detected object with respect to the determined working area, and to selectively generate images from one or more of the cameras on the display unit, said one or more cameras having image regions corresponding to the determined positions of each detected object with respect to the determined working area.

2. The self-propelled work vehicle of claim 1, wherein:
one or more of the plurality of object sensors comprise ultrasonic sensors configured to generate object signals corresponding to a distance between a detected object and the respective sensor.

3. The self-propelled work vehicle of claim 1, wherein the controller is further configured to:
determine a swing radius of the work implement based on an orientation of the work implement and/or an angle of rotation about the one or more axes, and
receive signals representative of the orientation and/or rotational movement of the work implement, and
generate the output signals further based on a predicted second working area for the work vehicle corresponding to the swing radius of the work implement, in view of the orientation and/or rotational movement of the work implement.

4. The self-propelled work vehicle of claim 3, wherein:
the output signals comprise one or more control signals to disable rotational movement of the machine frame if one or more objects are detected within the swing radius of the second end of the machine frame, and to disable rotational movement of the machine frame and of the work implement if one or more objects are detected within the swing radius of the work implement.

5. The self-propelled work vehicle of claim 3, wherein:
the controller is further configured to
receive signals representative of a detected movement and orientation of one or more of the ground engaging units, and
generate the output signals further based on the predicted second working area in view of the detected movement and orientation of the one or more of the ground engaging units.

6. The self-propelled work vehicle of claim 3, wherein:
the controller is further configured to
receive signals representative of an intended movement and orientation of one or more of the ground engaging units, and
generate the output signals further based on the predicted second working area in view of the intended movement and orientation of the one or more of the ground engaging units.

7. The self-propelled work vehicle of claim 6, wherein:
locations of each detected object are determined in a reference plane independent of an orientation of the machine frame, and
the predicted second working area is determined further based on an intended movement of the work vehicle in the reference plane independent of the orientation of the machine frame.

8. The self-propelled work vehicle of claim 1, wherein:
the output signals comprise one or more control signals to disable movement of the ground engaging units if one or more objects are detected within the determined working area.

9. The self-propelled work vehicle of claim 8, wherein:
the controller is configured to
receive signals representative of a movement and orientation of one or more of the ground engaging units,
generate at least the one or more control signals to disable movement of the ground engaging units, when the vehicle is detected as moving and further based on a predicted working area, and
wherein the output signals are at least provided to generate one or more visual or audible alerts to an operator of the vehicle, when the vehicle is not moving.

10. The self-propelled work vehicle of claim 1, wherein:
the controller is configured to provide the output signals to prioritize one or more of the plurality of cameras in the selectively generated images on the display unit based on the determined positions of each detected object with respect to the determined working area.

11. The self-propelled work vehicle of claim 1, wherein:
overlapping images generated from each of the individual image regions are joined together to form a total image on the display unit from a bird's eye view, and
wherein the output signals from the controller are at least provided to visually render the determined positions of each detected object in association with the total image on the display unit.

12. A method of alerting operators of a self-propelled work vehicle to the presence of objects in a working area, wherein the vehicle has a machine frame that is supported by a plurality of ground engaging units and is selectively rotatable relative to the ground engaging units or based on differential driving of the ground engaging units, wherein the vehicle has a work implement supported by the machine frame and extending from a first end thereof and selectively rotatable about one or more axes associated with the machine frame, the method comprising:
generating object signals from one or more of a plurality of object sensors, the object signals representative of detected objects in a respective field of vision, wherein at least one of the plurality of object sensors has a field of vision including surroundings of an opposing second end of the machine frame with respect to the first end;
generating images corresponding to a respective image region for each of a plurality of cameras, wherein the respective field of vision for each of the plurality of object sensors overlaps with the image region for at least one of the plurality of cameras determining a working area for the work vehicle, corresponding at least to a swing radius of the second end of the machine frame and to detected and/or intended movements of the machine frame
for each object sensor, determining a distance from the respective object sensor to any one or more of the detected objects in the respective field of vision, and to compare the distance for each of the one or more detected objects to a threshold value that is determined based at least on the determined working area and on a known position of the respective object sensor relative to the machine frame; and
generating output signals based on the compared distances for each of the one or more detected objects with respect to the respective threshold values,
wherein one or more of the output signals are provided to generate visual alerts on a display unit located in association with an operator of the vehicle, the visual alerts identifying sensors corresponding to the determined positions of each detected object with respect to the determined working area, and to selectively generate images from one or more of the cameras on the display unit, said one or more cameras having image regions corresponding to the determined positions of each detected object with respect to the determined working area.

13. The method of claim 12, further comprising:
determining a swing radius of the work implement based on an orientation of the work implement and/or an angle of rotation about the one or more axes;
receiving signals representative of the orientation and/or rotational movement of the work implement; and
generating the output signals further based on a predicted second working area in view of the orientation and/or rotational movement of the work implement.

14. The method of claim 13, wherein:
the output signals comprise one or more control signals to disable movement of the work implement if one or more objects are detected within the predicted second working area.

15. The method of claim 13, further comprising:
detecting an actual or intended movement and orientation of the ground engaging units; and
generating the output signals further based on the predicted second working area in view of the detected actual or intended movement and orientation of the ground engaging units.

16. The method of claim 12, further comprising:
detecting movement and orientation of the ground engaging units;
generate at least the one or more control signals to disable movement of the ground engaging units, when the vehicle is detected as moving and further based on a predicted working area, and
wherein the output signals are at least provided to generate one or more visual or audible alerts to an operator of the vehicle, when the vehicle is not moving.

17. The method of claim 12, wherein the output signals are provided to prioritize one or more of the plurality of cameras in the selectively generated images on the display unit based on the determined positions of each detected object with respect to the determined working area.

18. The method of claim 12, further comprising:
joining together overlapping images generated from each of the individual image regions to form a total image on the display unit from a bird's eye view;
wherein the output signals are at least provided to visually render the determined positions of each detected object in association with the total image on the display unit.

* * * * *